(12) United States Patent
Valade et al.

(10) Patent No.: US 10,520,920 B2
(45) Date of Patent: Dec. 31, 2019

(54) PRINTING SYSTEM FOR PRINTING AN OBJECT HAVING A SURFACE OF VARYING HEIGHT

(71) Applicant: Océ Holding B.V., Venlo (NL)

(72) Inventors: Cédric T. Valade, Villiers sur Marne (FR); Felicia G. Ionascu, Bonneuil-sur-Marne (FR)

(73) Assignee: OCÉ HOLDING B.V., Venlo (NL)

( * ) Notice: Subject to any disclaimer, the term of this patent is extended or adjusted under 35 U.S.C. 154(b) by 267 days.

(21) Appl. No.: 15/788,089

(22) Filed: Oct. 19, 2017

(65) Prior Publication Data

US 2018/0120814 A1 May 3, 2018

(30) Foreign Application Priority Data

Oct. 27, 2016 (EP) .................................. 16195912

(51) Int. Cl.
*G05B 19/4099* (2006.01)
*H04N 5/222* (2006.01)
(Continued)

(52) U.S. Cl.
CPC ........ *G05B 19/4099* (2013.01); *B29C 64/393* (2017.08); *B33Y 30/00* (2014.12);
(Continued)

(58) Field of Classification Search
CPC ...... G05B 19/4099; G05B 2219/49023; B29C 64/393; B33Y 50/02; B33Y 30/00; H04N 13/117; H04N 13/279; H04N 5/2224
See application file for complete search history.

(56) References Cited

U.S. PATENT DOCUMENTS

| 8,976,415 B2 | 3/2015 | Klein Koerkamp et al. |
| 2005/0173838 A1* | 8/2005 | Priedeman, Jr. .... B29C 71/0009 264/401 |

(Continued)

FOREIGN PATENT DOCUMENTS

WO   WO 2016/083796 A1   6/2016

OTHER PUBLICATIONS

Lumion, "Lumion Tutorial", YouTube, XP054977278, Sep. 27, 2016, URL: https://www.youtube.com/watch?v=1re9XtfglTY.
(Continued)

*Primary Examiner* — Ziaul Karim
(74) *Attorney, Agent, or Firm* — Birch, Stewart, Kolasch & Birch, LLP

(57) ABSTRACT

A printer control system for controlling the printing of an object on a support in a number of passes on top of each other includes a user interface which has a display device and is arranged to visualize in a window on the display device a pixel-precise preview image before printing of the object. The preview image includes a representation of the surface of the object. The printer control system further includes a digital analyser for analysing the pass images in order to deduce before printing of the object locations of smooth areas at the surface of the object, and a preview emulator for digitally shining on the pixel-precise preview. The printer control system calculates a digital move path to be applied by the preview emulator over the pixel-precise preview based on the locations of the smooth areas in order to highlight regions of interest with a potential print artefact.

14 Claims, 8 Drawing Sheets

(51) Int. Cl.
  *H04N 13/117*   (2018.01)
  *H04N 13/279*   (2018.01)
  *B33Y 30/00*    (2015.01)
  *B33Y 50/02*    (2015.01)
  *B29C 64/393*   (2017.01)

(52) U.S. Cl.
  CPC ............ *B33Y 50/02* (2014.12); *H04N 5/2224* (2013.01); *H04N 13/117* (2018.05); *H04N 13/279* (2018.05); *G05B 2219/49023* (2013.01)

(56) References Cited

U.S. PATENT DOCUMENTS

| | | | | |
|---|---|---|---|---|
| 2012/0224755 | A1* | 9/2012 | Wu ........................ | G06T 17/00 382/131 |
| 2013/0330476 | A1* | 12/2013 | Klein Koerkamp ..... | B05D 5/06 427/258 |
| 2014/0117585 | A1* | 5/2014 | Douglas ................ | B33Y 30/00 264/401 |
| 2015/0205553 | A1* | 7/2015 | Kobayashi ............ | G06F 3/1256 358/1.15 |
| 2016/0236279 | A1* | 8/2016 | Ashton ................ | B22F 3/1055 |

OTHER PUBLICATIONS

Morten, "Quickstart Guide for Lumion 6.5.1", XP002768844, Oct. 1, 2015, URL: https://forum.lumion3d.com/index.php?action=printpage;topic=108601.0.

Search Report for European Patent Application No. 16195912, completed on May 9, 2017.

* cited by examiner

PRINTING SYSTEM FOR PRINTING AN OBJECT HAVING A SURFACE OF VARYING HEIGHT

BACKGROND OF THE PRESENT INVENTION

1. Field of the Present Invention

The present invention relates to a printer control system for controlling the printing of an object on a support by printing in a number of passes on top of each other, the object having a surface of varying height. The printer control system comprises a user interface having a display device and arranged to visualize in a window on the display device a pixel-precise preview image before actual printing of the object. The pixel-precise preview image comprises a representation of the surface of the object in an image resolution at pixel level. Such a resolution may be—for example—600 dots per inch by 600 dots per inch, or 1200 dots per inch by 1200 dots per inch, etc.

The term "printing" or "print" refers to building an object from print material by additive manufacturing, and includes, in particular, jetting print material for depositing the print material on the support or an already printed portion of the object.

The term "printer control system" and "print controller" refer to the same.

2. Description of the Related Art

Print systems are known that allow printing of multilayer structures that can reach a considerable height as compared to conventionally printed images that are basically flat, or, at least, the height of which is generally disregarded. The structures are generated by stacking layers of material on top of each other. For example, radiation curable ink, in particular UV curable ink, may be used. By repeatedly printing a layer on top of a previously printed, cured layer, a multilayer structure may be built up having a defined height. For example, the height may be up to 10 mm or more. The height, i.e. the thickness of the printed structures, adds an extension in a further dimension to the two dimensional image, and, accordingly, such prints are termed 2.5D prints or relief prints. The printed structure may comprise an image, e.g. a color image. The height dimension of the object is usually represented by a digital height map, for example a height bitmap of grey tones.

U.S. Pat. No. 8,976,415 describes a method for generating relief prints, including processing a relief image, comprising color channels for indicating a color of each pixel and a height channel for indicating a height of each pixel, into several passes that are printed using a printer with several colorants including a white colorant. For each pixel a relief part, a white part and a skin part are discriminated. A height variation of individual pixels is caused by repetitive printing of colorants in the relief part. A number of pass images are derived from the relief image to be printed on top of each other. All available colorants may be used in the relief part, in order to provide for an optimal print speed for this part. The skin part comprises pass pixels for which a colorant composition based on the color channels of the relief image is established. Hereinafter the relief part is also mentioned as underground of the object to be printed. Hereinafter the skin part is also mentioned as surface of the object to be printed.

One of the well-known issues of 3D printing is a contouring effect due to artifacts in the grey-level height map in the field of inkjet additive manufacturing. A problem is that such a contouring artifact may be observable only once the print is finished. However, printing large size 2.5 D or 3D designs on an inkjet printing system is an expensive and time-consuming operation. Such a contouring artifact is also known as a stair casing artifact, a banding artifact or a posterization artifact.

It is an object of the present invention to provide a printer control system to facilitate fast printing of relief prints or 3D prints with high surface quality or, in general, enhanced visual print quality of a relief or 3D printed object.

SUMMARY OF THE PRESENT INVENTION

According to the present invention, this objective is achieved in that the printer control system comprises a digital analyser which is configured to analyse a height map produced at design level for printing the object in order to deduce before actual printing of the object locations of smooth areas potentially presenting a contouring artifact at the surface of the object, and a preview emulator configured to digitally shine with a virtual light on the pixel-precise preview from a settable light position above the pixel-precise preview, wherein reflections of the virtual light on the surface of the object are captured by a virtual camera at a settable camera position above the pixel-precise preview, wherein the printer control system is configured to calculate a digital move path of the virtual light or the virtual camera over the pixel-precise preview, the digital move path to be applied by the preview emulator and based on the locations of the smooth areas in order to emphasize regions of interest with the potential contouring artefact in the pixel-precise preview.

The object has a surface of varying height, in particular of a height in a thickness direction or Z-direction that varies over X, Y-coordinates of the support. The height of the pixels corresponds to an extension or thickness of the pixels in the Z-direction represented in a digital height map.

The digital analyser may comprise a software and/or hardware component that performs an analysis of the digital height map generated when designing the object. The analysis may result in a binary image that comprises indications for smooth areas as viewed from the settable viewpoint for the virtual camera on the pixel-precise preview. The viewpoint of the virtual camera may be defaulted as from the top of the printed object. According to an embodiment an angle of the viewpoint of the virtual camera on the pixel-precise preview with respect to the support is settable by means of the user interface. The analysis may also result in a binary image that comprises indications for smooth areas as viewed from the settable light point for the virtual light on the pixel-precise preview. The light point of the virtual light may be defaulted as from the top of the printed object. According to an embodiment an angle of the light point of the virtual light on the pixel-precise preview with respect to the support is settable by means of the user interface.

A pixel-precise preview is generated based on the analysis by the digital analyser by means of a digital transformer. The digital transformer may comprise a 3D visualization software and/or hardware component that exploits the binary image to render the surface of the object to be printed into a pixel-precise preview of the surface of the object.

A pixel-precise preview is a preview that determines a height of a surface pixel of the object to be viewed per pixel of the 2D base plane of the object.

A smooth area is defined as a connected area having a texture that lacks friction, for example without sharp edges or peaks. It is the opposite of a rough area. A smooth area may be a plane, a little undulating area or a little sloping area. A smooth area is an area with low frequency variations of gray level values in the smooth area. The low frequency variations are low spatial frequency variations in a frequency domain of a digital image, for example in the sense of a Fourier transform.

After detection of the smooth areas on the surface of the object before printing the object, a digital move path is defined from one smooth area to another. The digital move path may lead from one center of a smooth area to a center of another smooth area. The preview emulator may emulate a moving of a virtual light or a virtual camera over the surface of the object along the digital move path in the pixel-precise preview from one smooth area to another smooth area. By digitally shining on the smooth areas in the pixel-precise preview at the user interface of the printing system, a contouring artifact located in a smooth area becomes visible. A designer is able to rework the design so that the contouring artifact is less visible or an operator and user are able to select another print strategy with less contouring artifacts. In case only one smooth area is detected a digital move path may traverse the surface through the center of the single smooth area.

The object may be a relief print, and may be printed on a support in the form of a substantially flat substrate. The object may be a 3D structure, and may be printed on a support which has a form of another 3D structure or on a support which has a form of a substantially flat substrate.

The inventors have found that, when pixels of different heights are used for building an elevation or relief part of relief prints, visible contouring artifacts may occur on flat or smoothly sloped surfaces of relief prints. Since the preview is generated on a pixel precise basis, and smooth areas are shined on when the virtual light or the virtual camera from the preview emulator is traversing the digital move path, contouring artifacts are shown pixel-precisely since the contouring artifacts form highlighted parts and shadowing parts on the smooth areas due to the preview emulation. Within a smooth area, a virtual set of rays that hit a contouring artifact and reflect towards the virtual camera have a reflectance value that is high on parts of the contouring artifact, i.e. a specular component with high energy, and very low on other parts of the contouring artifact, i.e. a diffuse component with low energy. The reflectance transition of rays is then converted by the virtual camera onto an digital image on a screen of the user interface. For a given virtual light position in the virtual 3D space or for a given virtual camera position in the virtual 3D space, the displayed image on the screen exhibits an enhanced contours visualization by rendering the reflectance transition with whitisch pixels and blackish pixels on the screen. The contouring artifact is then emphasized.

Potential contouring artifacts are emphasized and the coordinates of the involved pixels are identifiable. By means of the identified coordinates of the involved pixels a designer may change the digital height map of the object in order to reduce the contouring artifact or to let the contouring artifact vanish.

According to an embodiment the digital move path is a path consisting of connected curves or line pieces and at least one of the ends of each curve or line piece coincides with a center of a deduced location of a smooth area. Such a center may be a centroid of the smooth area.

According to an embodiment the digital move path is a differentiable path through centers of at least one deduced location of a smooth area. This is advantageous, since the digital move path does not comprise sharp bights that would impede the user to follow the light traversing the digital move path.

According to an embodiment the printer control system is configured to show coordinates of a pixel on the digital move path on or near the window of the pixel-precise preview when the virtual light from the preview emulator is traversing the pixel on the digital move path. By means of the shown coordinates of the involved pixels a designer may change the digital height map of the object in order to reduce the contouring artifact or to let the contouring artifact vanish.

According to an embodiment the window comprises a test function for changing a parameter which influences the pixel-precise preview of the surface of the object and the printer control system is configured to create a new pixel-precise preview for each change of the parameter as to allow a user to compare a visual appearance of the smooth areas in the surface of the object in the pixel-precise preview with a visual appearance of the smooth areas in the surface of the object in a next pixel-precise preview.

According to an embodiment the window comprises a test function for selecting at least one other print strategy for printing the object and the printer control system is configured to create a new pixel-precise preview for each of the at least one print strategy as to allow a user to compare a visual appearance of the smooth areas in the surface of the object in the pixel-precise preview with a visual appearance of the smooth areas in the surface of the object in a next pixel-precise preview.

The present invention also relates to a printer for printing of an object on a support by printing a number of pass images on top of each other, the object having a surface of varying height, the printer comprising the print control system according to the present invention.

The present invention also relates to a method for controlling the printing of an object on a support by printing in a number of passes on top of each other, the object having a surface of varying height, the method comprising the steps of analysing a height map for the object produced at design level in order to deduce before actual printing of the object locations of smooth areas potentially presenting a contouring artifact at the surface of the object, calculating a digital move path of a virtual light over a pixel-precise preview of the surface of the object, the digital move path being relative to a settable viewpoint on the pixel-precise preview and based on the locations of the smooth areas, the digital move path to be used by a preview emulator of the printing system, displaying the pixel-precise preview at a user interface of a print control system, and digitally shining on the pixel-precise preview of the surface of the object by the virtual light traversing the digital move path by means of the preview emulator in order to emphasize regions of interest with the potential contouring artefact at the surface of the object in the pixel-precise preview.

The present invention also relates to a non-transitory recording medium comprising computer executable program code configured to instruct a computer to perform the method according to the present invention.

BRIEF DESCRIPTION OF THE DRAWINGS

Embodiment examples of the present invention will now be described in conjunction with the drawings, wherein.

DETAILED DESCRIPTION OF EMBODIMENTS

Figure 1:
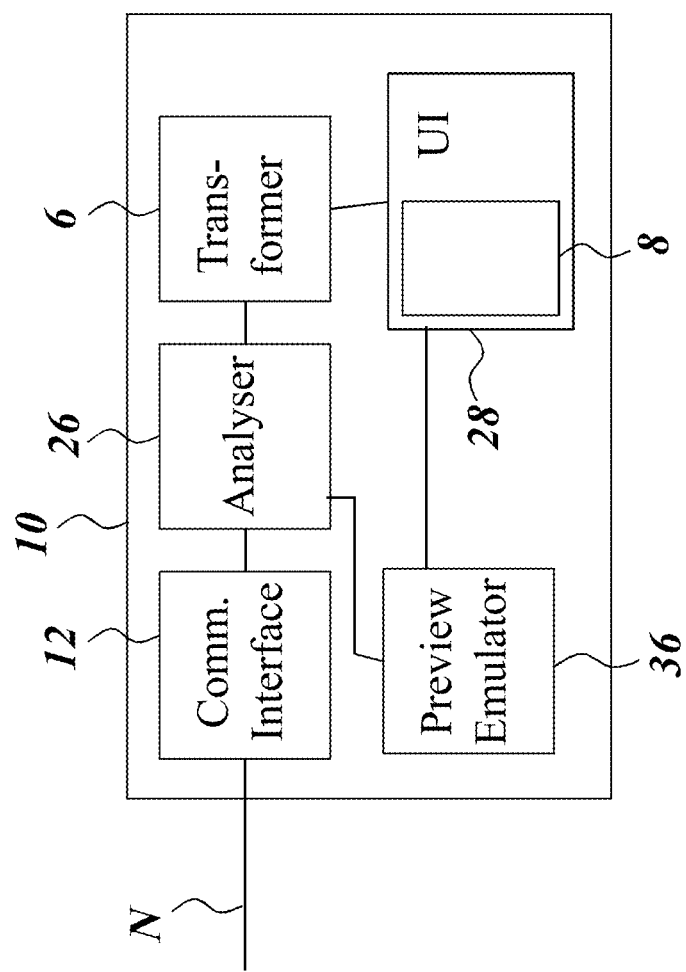
FIG. 1 is a block diagram of a printer control system according to the present invention.

FIG. 1 schematically shows a printer control system 10 also referred to as a printer controller for previewing 3D objects. The print controller 10 receives print data in the form of an object image comprising height data, also referred to as a height map or a digital height map, e.g. in the form of a height channel, for indicating a height of each pixel of the object image, and comprising color data, also referred to as a 2D color map of a plane of pixels, e.g. in the form of a number of color channels, for indicating a color of each pixel. For example, there are five customary color channels for colorants of the colors cyan (C), magenta (M), yellow (Y), white (W), black (K). The height map specifies, for two-dimensional print coordinates X, Y, the height of the respective pixel of the image. The height map describes a height, i.e. a thickness, of the object in the third dimension Z.

The print controller 10 includes a communication interface 12 connected e.g. to a network N for receiving the print data.

According to the present invention the print controller 10 further comprises a digital analyser 26, a digital transformer 6 and a preview emulator 36, which may be implemented in software and/or hardware. The digital analyser 26 is configured to analyze the digital height map for the object to be printed in order to determine locations of smooth areas at the surface of the object. The digital analyser 26 also determines a digital move path along the smooth areas. The digital transformer 6 is configured to transform the digital height map together with the color pixel data into a 3D model of a surface of the object suitable for previewing on a user interface 28. The preview emulator 36 receives coordinates of the digital move path through the smooth areas from the digital analyser 26. When the preview of the surface of the object is shown at a window 8 of the user interface 28, the preview emulator 36 submits signals to the user interface 28 for arranging a virtual light or a virtual camera to traverse the surface of the object in the pixel-precise preview along the digital move path received by the preview emulator 36 from the digital analyser 26.

The user interface 28 is arranged to visualize in a window 8 the pixel-precise preview image comprising the representation of the surface of the object before printing the object by means of a printer (not shown). Possible contouring artifacts in the smooth areas are highlighted when the light moves along the smooth areas on the surface of the object. The user interface may be a local user interface at a printer according to the present invention or a remote user interface. The user interface may be wired to a printer according to the present invention or wirelessly connected to a printing system according to the present invention. The printer control system 10 may be a remote printer control system wired or wirelessly connected to a printer according to the present invention.

Figure 2:
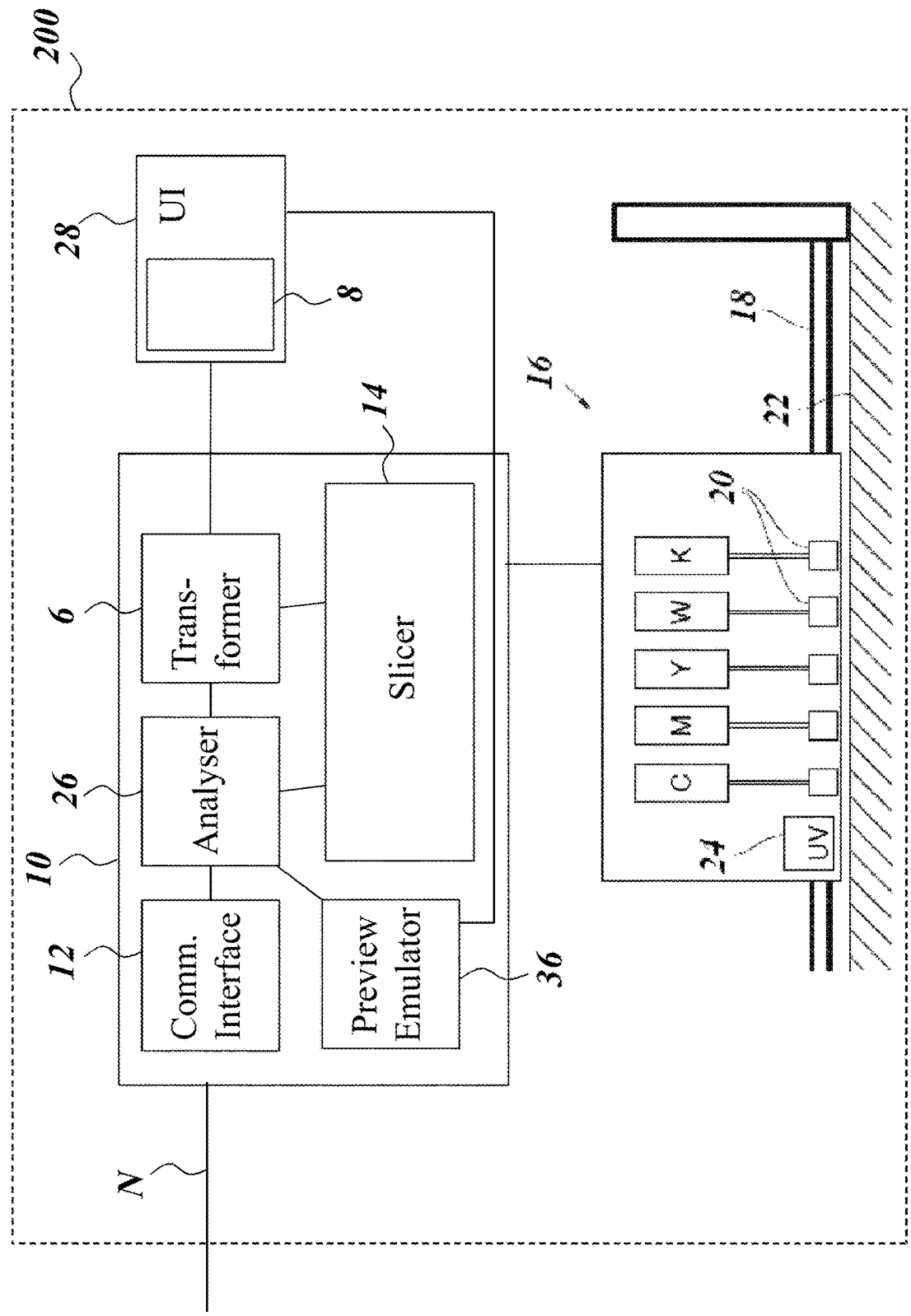
FIG. 2 is a block diagram of a printer according to the present invention.

FIG. 2 schematically shows a printer 200 according to the present invention which comprises an integrated printer controller 10 according to the present invention. The printer is configured to print 3D objects by depositing material on a support 22 in a number of printing passes.

The print controller 10 includes the communication interface 12 connected e.g. to a network N for receiving the print data, the digital analyser 26, the transformer 6, the preview emulator 36 and a digital image slicer 14 configured for converting the print data into a number of pass images in a format suitable for driving a print engine 16 synchronized with a motion control system 18 configured for controlling relative motion between print heads 20 of the print engine 16 and the support 22. The motion control system 18 comprises print carriage motion controllers of first and second printing directions X, Y and, optionally a print carriage height controller Z for controlling a height of the print heads 20 above the support 22. For example, the motion control system 18 is configured to control relative motion between the print heads 20 and the support 22 in the X, Y, and Z direction. The print heads have nozzles for jetting the colorants onto the support 22. The print system is a system for printing relief prints using UV curable ink and includes a UV curing device 24.

The user interface 28 is now connected to the printer controller 10 instead of incorporated into the printer controller as is shown in FIG. 1. The user interface 28 is arranged to visualize in a window 8 the preview image comprising the representation of the surface of the object before printing the object by means of the print engine 16. A possible contouring artifact in a smooth area of the surface of the object is visible in the pixel-precise preview when the virtual light from the preview emulator 36 is shining on the smooth area. The user interface 28 may be a local user interface at the printer 16 or a remote user interface. The user interface 28 may be wired to the print control system 10 or wirelessly connected to the print control system 10.

At first the smooth areas at the surface of the object are derived from the digital height map 310. For example, the height map is blurred using a big kernel. A zenith angle for each point of the height map is computed resulting in a zenith angle map. From the zenith map local smoothness is determined in small blocks resulting in a smoothness map. From the smoothness map smooth area contours and their centers are found resulting in smooth area center coordinates. Computation of the normal vectors for the centers of the smooth areas is conducted.

From the smooth area center coordinates a digital path is computed. From the computed path, camera coordinates and a normal of the smooth area center, a reflection of the surface of the 3D object is computed.

A path from a center of one smooth area to a center of another smooth area is determined. Or in case there is only one smooth area, a path through the center of the smooth area across the smooth area is determined. The path may be from a border point of the smooth area through the center of the smooth area to the opposite border point is determined.

With the input of the digital height map 310 and the maximum height value 320 a 3D model 340 of the design is generated. The maximum height value 320 is necessary for determining the height of the viewpoint of the virtual camera above the surface of the object and the height of the virtual light source above the surface of the object. The 3D model 340 is rendered 360 with input from a bidirectional reflectance distribution (BRDF) function 350 with a specular component. A Cook-Torrance BRDF model may be used to describe a reflection of the surface, but other BRDF models associated to material simulation with specularity may be used. It is noted that a mere or exclusive diffuse (lambertian) BRDF is not suited for this method. The rendered 3D model is a shaded 3D model 370 of the surface of the object to be previewed.

Figure 3:
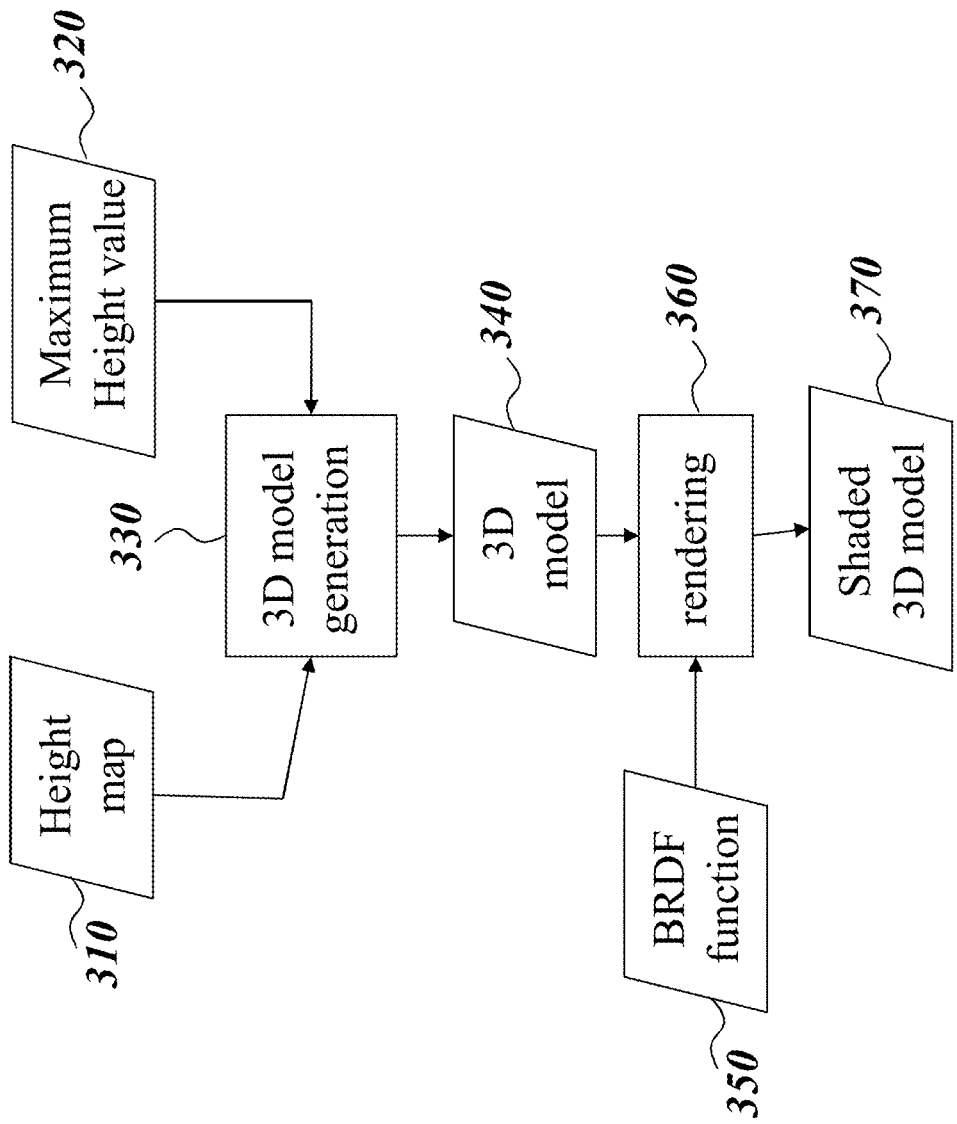
FIG. 3 is a flow diagram of an embodiment of the method according to the present invention.

In the following, previewing of a 3D object will be exemplarily explained with respect to FIG. 3. At least one virtual light and at least one virtual camera are introduced by means of the preview emulator according to the present invention. A normal vector at pixel precision at a center of a smooth area may be derived from the height map. In first instance, with light positions conveniently chosen in 3D space with respect to the coordinates of the smooth area centers and knowing the normal of the center of the smooth area, an optimum for the virtual camera position may be computed. In second instance, the virtual camera is positioned at the computed position. Knowing the BRDF function associated to the surface and the previously positioned lights, the reflected lights as well as the intensities of the reflected lights towards the virtual camera are computed and shown at the preview in the screen of the user interface. A real-time rendering shading language as GLSL or HLSL may be use for implementation. Coordinates (x, y, z) of the shaded surface may be computed from the height map by casting a virtual ray and taking a first intersection between the light ray and a vertical segment of the surface pixels whose length relates to the grey level of the height map. Depending on the camera position and light position with respect to the support and on the geometry of the surface, areas appear more or less lightened. For a fixed camera viewpoint, a light move path in space which highlights all design contours may be generated by looking at maximum specular components of reflection for each light position. According to an alternative embodiment a virtual light may be introduced for each detected smooth area and each virtual light may traverse its own smooth area. By doing so, an automatic computation of the light path based on specularity maxima is established.

Inversely, for a fixed virtual light position a camera move path in space may be generated by looking at maximum specular components of reflection for each camera position. As such, in the method according to the present invention the 3D model is not processed as with a conventional image processing approach such as filtering which may degrade and remove useful information. The inventors have realized that the proposed method resides in putting the 3D model in lighting conditions and material surface simulation that make invisible details of the height map appear visible in the pixel-precise preview on a computer screen and making a quality of the contour highlighting superior.

Contouring introduced at a design phase of a digital object leads further to print quality defects for relief printing whereas—when applying the method according to the present invention—contouring is detected upfront by the visualization technique described by the method here-above. Print first right is key and soft proofing allows to avoid round trips between a print service provider and customers. The method according to the present invention solves this issue by making a print preparation and production process much more efficient.

Figure 4:
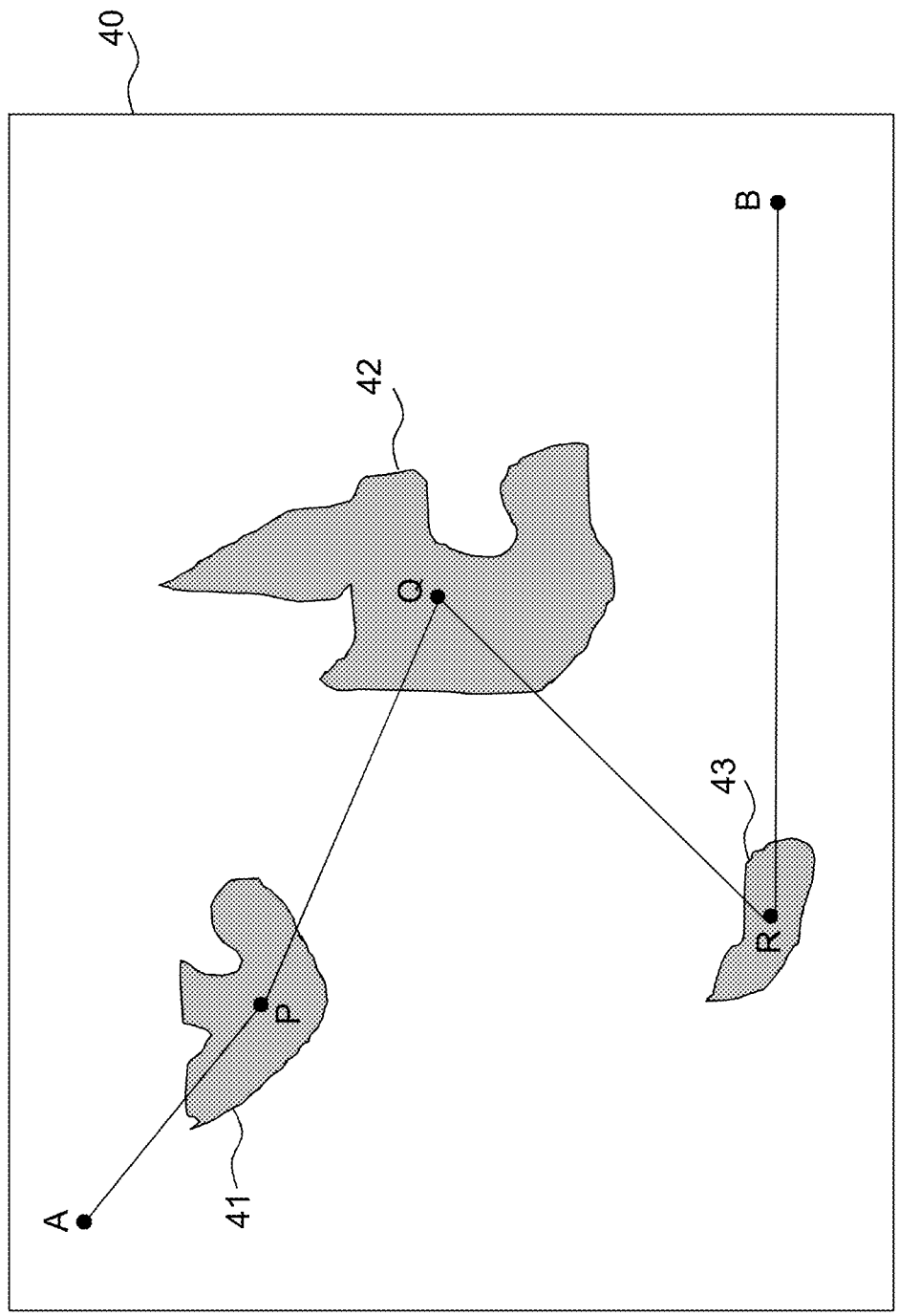
FIGS. 4-7 are schematic drawings of a user interface window showing a pixel-precise preview according to the present invention.

FIG. 4 shows a top view of an embodiment of the digital move path. On a display screen 40 of the user interface a digital move path APQRB is shown. The digital move path APQRB is a path from a starting point A to an end point B of connected line pieces AP, PQ, QR, RB. At least one of the ends P, Q, R of each line piece AP, PQ, QR coincides with a center of a deduced location of a smooth area 41, 42, 43 respectively. Such a center P, Q, R may be a centroid of the smooth area 41, 42, 43 respectively.

Figure 5:
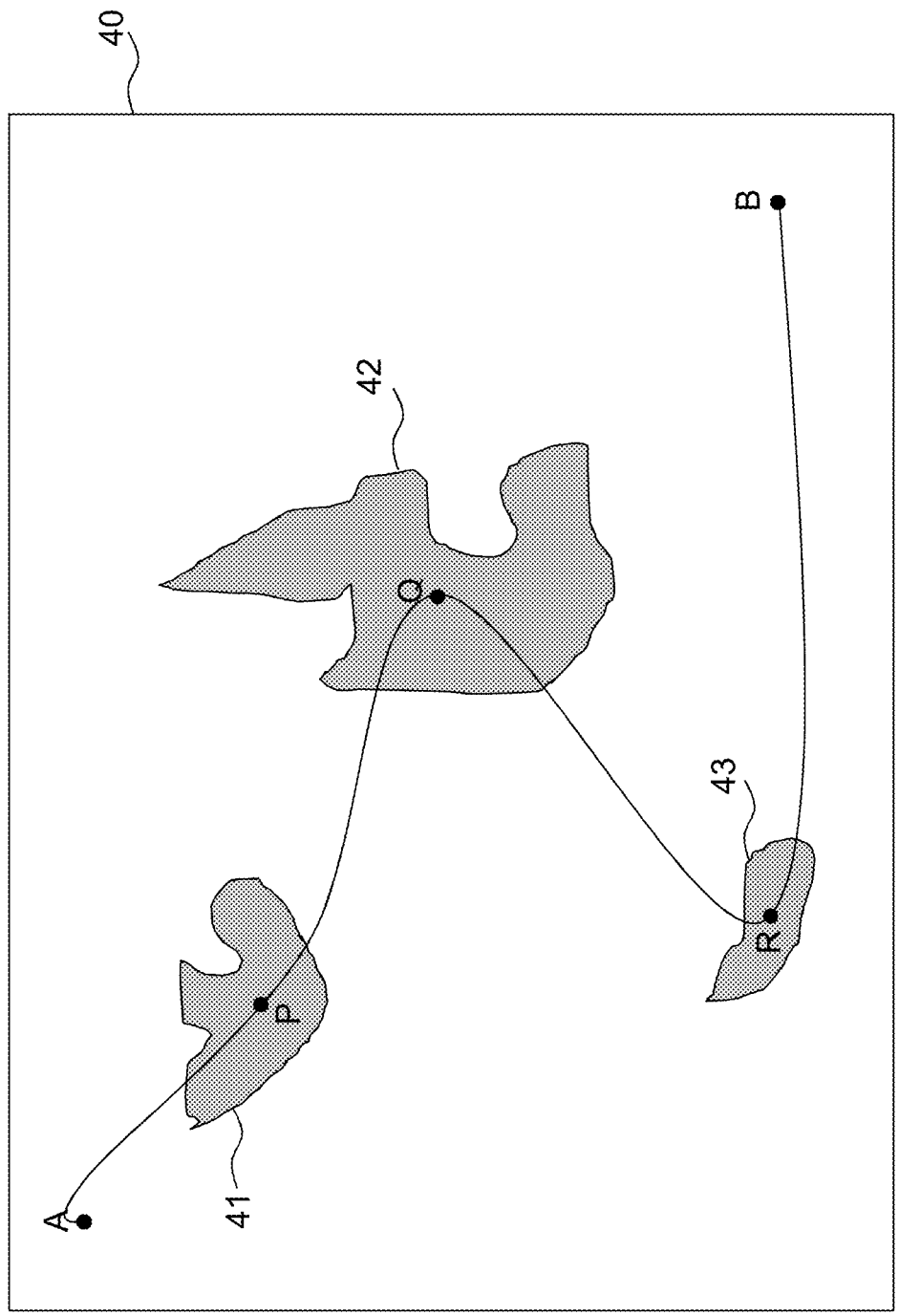

FIG. 5 shows a top view of another embodiment of a digital move path. On the display screen 40 a digital move path APQRB is a differentiable path through centers P, Q, R of at least one deduced location of a smooth area 41, 42, 43 respectively. This is advantageous, since the digital move path APQRB according to FIG. 5 does not comprises sharp bights as in FIG. 4 that would impede the user to follow the light or the camera traversing the digital move path. A differential path may be a quadratic path consisting of curves based on polynomials of a second degree.

Figure 6:
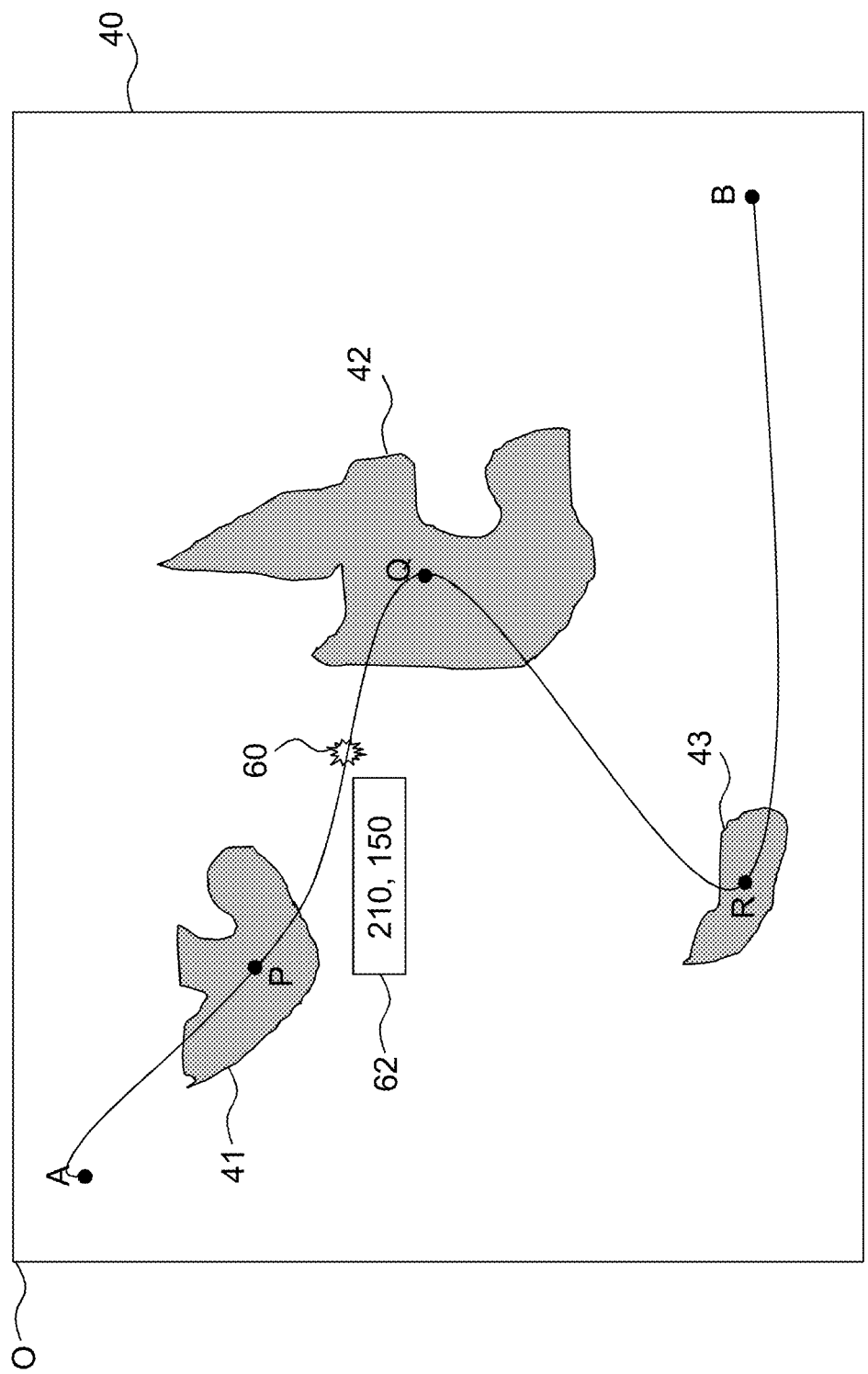

FIG. 6 shows the user interface screen 40 with the pixel-precise preview and coordinates 62 corresponding to a current position 60 of the light on the move path APQRB. The printer control system is configured to show coordinates 62 of the pixel 60—with respect to a predetermined origin O of the window 40—on the digital move path APQRB on or near the window 40 of the pixel-precise preview when the light from the preview emulator is traversing the digital move path APQRB. By means of the shown coordinates 62 of the involved pixels a designer may change the digital height map of the object in order to reduce the contouring artifact or to let the contouring artifact vanish. A velocity of traversing the light path APQRB may be predetermined by the preview emulator according to the present invention or settable by the operator by means of the user interface window according to the present invention. FIG. 6 shows a virtual light move path. A virtual camera move path may be envisioned analogously.

Figure 7:
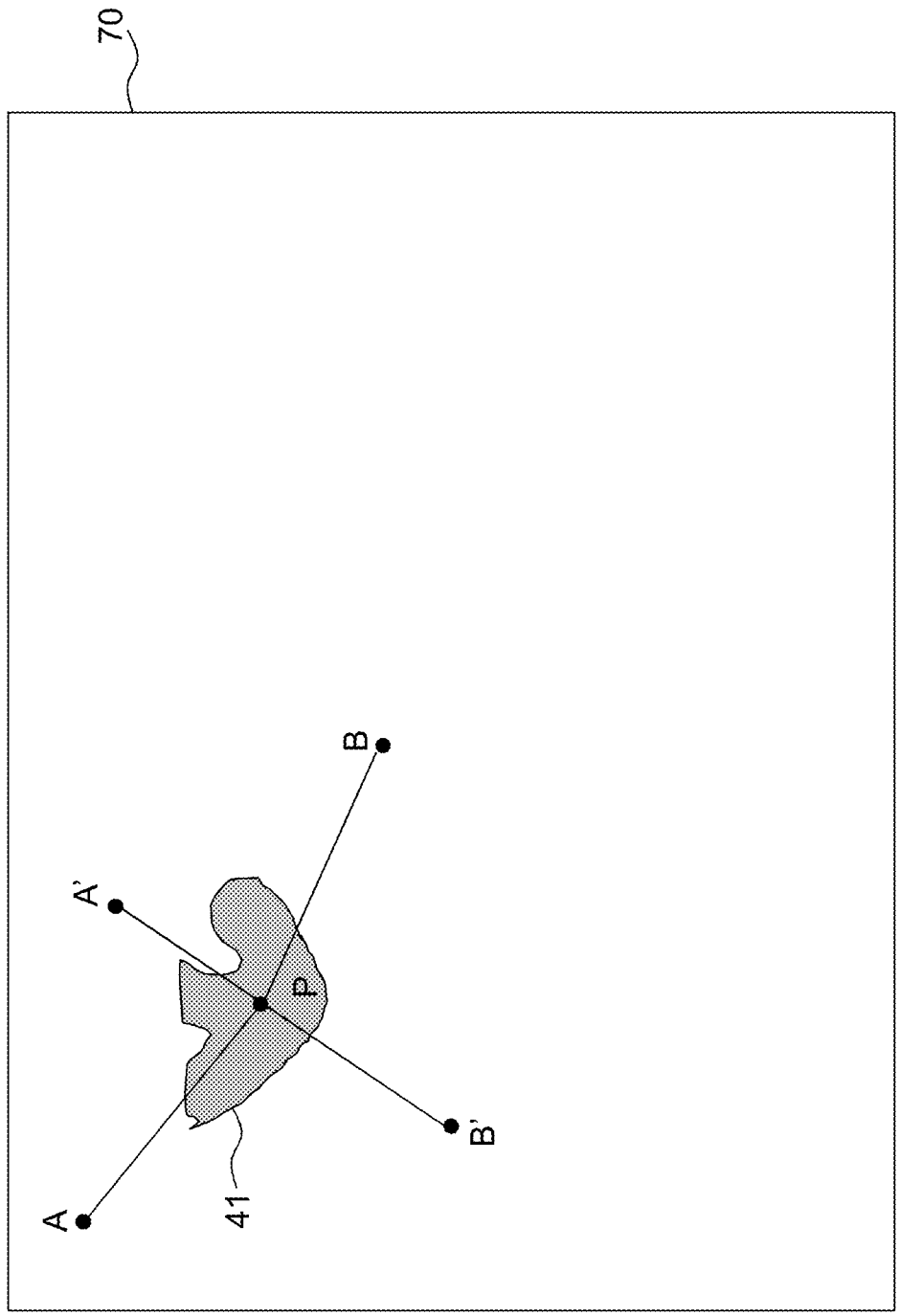

FIG. 7 shows a top view of an embodiment of the digital move path. On a display screen 70 of the user interface two digital move paths APB and A'PB' forming a "star path" are shown which are approximately perpendicular to each other. By traversing both move paths APB and A'PB' a possible contouring artifact will become visible. Also contouring artifacts which are located in the direction of AB will be visible when traversing from A' to B' and contouring artifacts which are located in the direction of A'B' will be visible when traversing from A to B. Star paths may be introduced for each detected smooth area.

Figure 8:
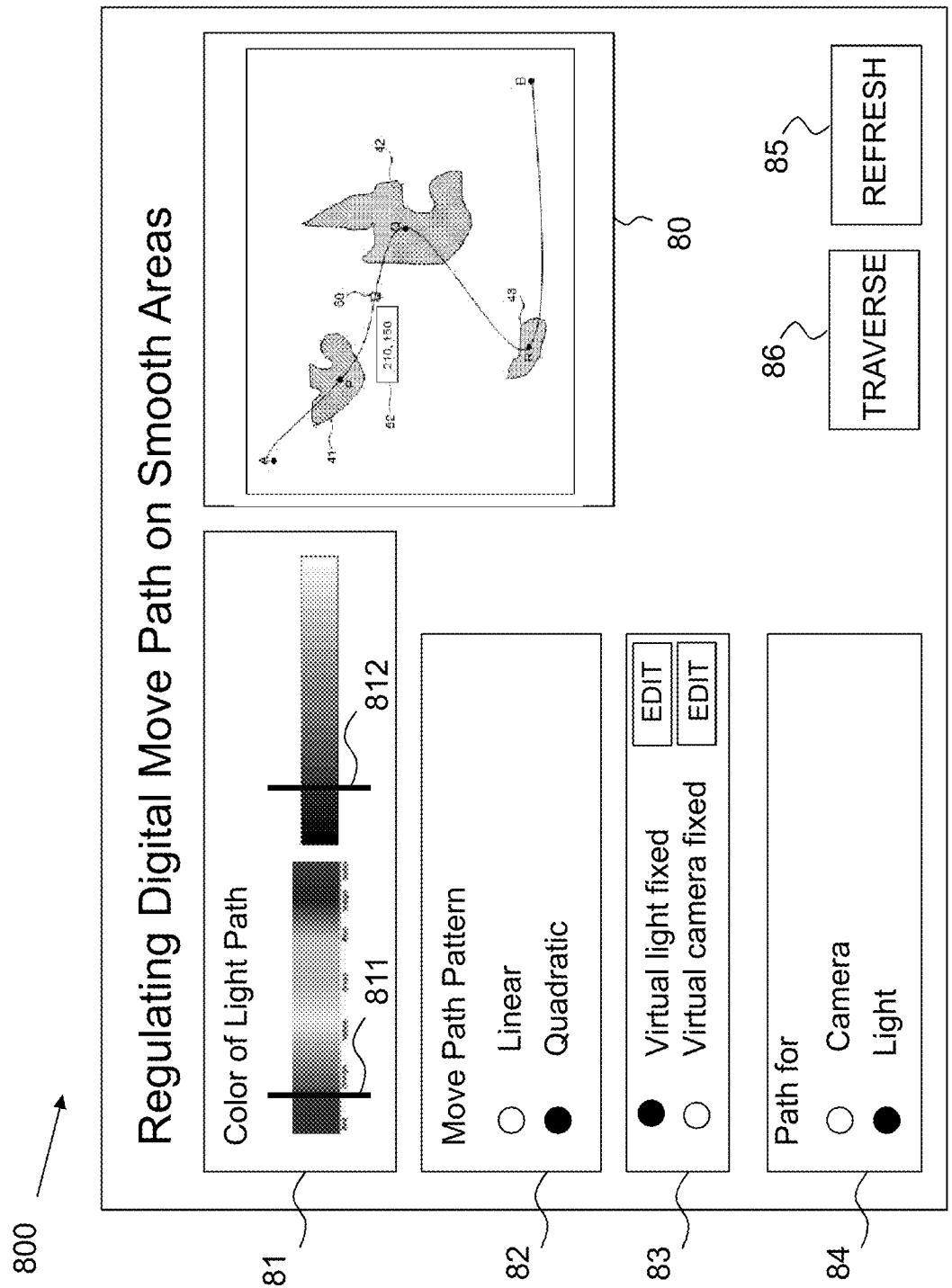
FIG. 8 shows an example of a user interface window for regulating the digital move path according to the present invention.

FIG. 8 shows an example of a user interface window 800 for the operator or user to regulate the digital move path on the smooth areas before actual printing of the object and to adjust a preview image 80 being a top view of the surface of the object including the move path and the detected smooth areas. For convenience reasons, the representation of the real surface of the digital object has been left out of the preview image 80, but is actually present in the preview image 80 at the user interface according to the present invention besides the move path and the detected smooth areas. In a preferred embodiment the preview image 80 comprises only the representation of the surface of the digital object and the move path and the detected smooth areas are left out.

The window 800 comprises a color function 81 for selecting a color for the move path representation in the preview image 80. A color may be selected from a color spectrum band with a first slider 811 or from a grey tone band with a second slider 812. When moving the first slider 811 or the second slider 812, a color of the move path in the preview image 80 will be automatically changed accordingly.

The window 800 comprises a move path pattern function 82 for selecting a linear move path or a quadratic move path by means of radio buttons.

The window 800 displays in a sub-window 83 an enabled edit button for editing three-dimensional coordinates of a position of the virtual light in 3D space and a three-dimensional direction vector of the virtual light since the radio button for a fixed virtual light is selected and a disabled edit button for editing three-dimensional coordinates of a position of the virtual camera in 3D space and a three-dimensional direction vector of the virtual camera. The disabled edit button will become enabled and the enabled edit button will become disabled when the radio button for the fixed virtual camera is selected.

Either the virtual light or the virtual camera is fixed. The three-dimensional coordinates may represent a point which is located high over the middle point of the surface of the object. If the virtual light is fixed, the camera coordinates are computed by software so that the camera coordinates are symmetrical with respect to the normal of the smooth area in order to maximize a specularity of the smooth area. For example—in normalized coordinates—for a normal of the smooth area with (0.25, 0.10, 1.0) and the virtual light is at (0.25, 0.18, 1.0), the virtual camera must be at (0.25, 0.02, 1.0). Mutatis mutandis, the reasoning above also applies to a fixed virtual camera.

The window 800 shows in a sub-window 84 the selection for a light move path or a camera move path. The path shown in the window 80 is the move path selected in the sub-window 84.

According to another embodiment the starting point A and the end point B of the move path APQRB may be selectable in a user interface window (not shown in FIG. 8).

A refresh button 85 refreshes the preview image 80 after a change of at least one parameter in the sub-windows 81-84. Preferably an update of the preview image 80 is carried out automatically after each change of a parameter in the sub-windows 81—84. A traverse button 86 activates the preview emulator to let the light or the camera traverse the move path APQRB in the preview image 80 from start point A to end point B. Actually the preview image is transformed into a simplistic movie in the same window 80.

A velocity of traversing the move path APQRB may be predetermined by the preview emulator according to the present invention and settable by the operator by means of a user interface window (not shown in FIG. 8).

The invention claimed is:

1. A printer control system for controlling the printing of an object on a support by printing in a number of passes on top of each other, the object having a surface of varying height, the printer control system comprising
   a user interface having a display device and arranged to visualize in a window on the display device a pixel-precise preview image before actual printing of the object, the pixel-precise preview image comprising a representation of the surface of the object,
   a digital analyser which is configured to analyse a height map produced at design level for printing the object in order to deduce locations of smooth areas potentially presenting a contouring artifact at the surface of the object, before actual printing of the object, and
   a preview emulator configured to digitally shine with a virtual light on the pixel-precise preview from a settable light position above the pixel-precise preview, wherein reflections of the virtual light are captured by a virtual camera at a settable camera position above the pixel-precise preview,
   wherein the printer control system is configured to calculate a digital move path of the virtual light or the virtual camera over the pixel-precise preview, the digital move path to be applied by the preview emulator and based on the locations of the smooth areas in order to emphasize regions of interest with the contouring artifact in the pixel-precise preview.

2. The printer control system according to claim 1, wherein the digital move path is a path consisting of connected curves or line pieces and at least one of the ends of each curve or line piece coincides with a center of a deduced location of a smooth area.

3. A printer for printing of an object on a support by printing a number of pass images on top of each other, the object having a surface of varying height, the printer comprising the print control system according to claim 2.

4. The printer control system according to claim 1, wherein the digital move path is a differentiable path through centers of at least one deduced location of a smooth area.

5. A printer for printing of an object on a support by printing a number of pass images on top of each other, the object having a surface of varying height, the printer comprising the print control system according to claim 4.

6. The printer control system according to claim 1, wherein the printer control system is configured to show coordinates of a pixel on the digital move path on or near the window of the pixel-precise preview when the virtual light from the preview emulator is traversing the pixel on the digital move path.

7. A printer for printing of an object on a support by printing a number of pass images on top of each other, the object having a surface of varying height, the printer comprising the print control system according to claim 6.

8. The printer control system according to claim 1, wherein the window comprises a test function for changing a parameter which influences the pixel-precise preview of the surface of the object and the printer control system is configured to create a new pixel-precise preview for each change of the parameter as to allow a user to compare a visual appearance of the smooth areas in the surface of the object in the pixel-precise preview with a visual appearance of the smooth areas in the surface of the object in a next pixel-precise preview.

9. A printer for printing of an object on a support by printing a number of pass images on top of each other, the object having a surface of varying height, the printer comprising the print control system according to claim 8.

10. The printer control system according to claim 1, wherein the window comprises a test function for selecting at least one other print strategy for printing the object and the printer control system is configured to create a new pixel-precise preview for each of the at least one print strategy as to allow a user to compare a visual appearance of the smooth areas in the surface of the object in the pixel-precise preview with a visual appearance of the smooth areas in the surface of the object in a next pixel-precise preview.

11. A printer for printing of an object on a support by printing a number of pass images on top of each other, the object having a surface of varying height, the printer comprising the print control system according to claim 10.

12. A printer for printing of an object on a support by printing a number of pass images on top of each other, the object having a surface of varying height, the printer comprising the print control system according to claim 1.

13. A method for controlling the printing of an object on a support by printing in a number of passes on top of each other, the object having a surface of varying height, the method comprising the steps of
   analysing a height map for the object produced at design level in order to deduce locations of smooth areas potentially presenting a contouring artifact at the surface of the object before actual printing of the object,
   calculating a digital move path of a virtual light over a pixel-precise preview of the surface of the object, the digital move path being relative to a settable viewpoint on the pixel-precise preview and based on the locations of the smooth areas, the digital move path to be used by a preview emulator of the printing system, displaying the pixel-precise preview at a user interface of a print control system, and digitally shining on the pixel-precise preview of the surface of the object by the virtual light traversing the digital move path by means of the preview emulator in order to emphasize regions of interest with the contouring artifact at the surface of the object in the pixel-precise preview.

14. A non-transitory recording medium comprising computer executable program code configured to instruct a computer to perform the method according to claim 13.

* * * * *